US006996514B2

(12) United States Patent
Gruber

(10) Patent No.: US 6,996,514 B2
(45) Date of Patent: Feb. 7, 2006

(54) TIME SIMULATION TECHNIQUES TO DETERMINE NETWORK AVAILABILITY

(75) Inventor: John G. Gruber, Orleans (CA)

(73) Assignee: Nortel Networks Limited, St. Laurent (CA)

( * ) Notice: Subject to any disclaimer, the term of this patent is extended or adjusted under 35 U.S.C. 154(b) by 920 days.

(21) Appl. No.: 09/853,711

(22) Filed: May 14, 2001

(65) Prior Publication Data

US 2002/0091506 A1 Jul. 11, 2002

Related U.S. Application Data

(63) Continuation-in-part of application No. 09/709,340, filed on Nov. 13, 2000.

(51) Int. Cl.
G06F 17/50 (2006.01)

(52) U.S. Cl. ............... 703/19; 379/14.01; 370/242
(58) Field of Classification Search ............ 703/19; 379/14.01; 370/242; 714/43, 1, 4; 709/224
See application file for complete search history.

(56) References Cited

U.S. PATENT DOCUMENTS

| | | | | |
|---|---|---|---|---|
| 5,699,403 A | * | 12/1997 | Ronnen | 379/15.04 |
| 6,003,090 A | * | 12/1999 | Puranik et al. | 709/235 |
| 6,009,079 A | * | 12/1999 | Boye et al. | 370/242 |
| 6,327,669 B1 | * | 12/2001 | Croslin | 714/4 |

FOREIGN PATENT DOCUMENTS

GB 234722 * 4/2000

OTHER PUBLICATIONS

Matthieu Clouqueur, Wayne D. Grover, Computational and Design Studies on the Unavailability of Mesh–restorable Networks, TRLabs, #800, 10611—98th Avenue, Edmonton, Alberta, Canada T5K 2P7.

* cited by examiner

*Primary Examiner*—Albert W. Paladini

(57) ABSTRACT

A time simulation technique for determining the service availability (or unavailability) of end-to-end network connections (or paths) between source and sink nodes is disclosed. The failure could be either a single failure mode or a multiple failure mode. The time simulation apparatus includes a network representation having pluralities of nodes, links and connections; each plurality having various attributes such as relating to failure, recovery and repair mechanisms. The apparatus further includes a mechanism for selecting one instance from each of the pluralities of nodes, links and connections based on the attributes; a failure/repair module for performing a simulated failure and repair on the selected instances as appropriate; a mechanism for selecting a connection between source and sink nodes; and an arithmetic mechanism for calculating availability of the selected connection.

9 Claims, 12 Drawing Sheets

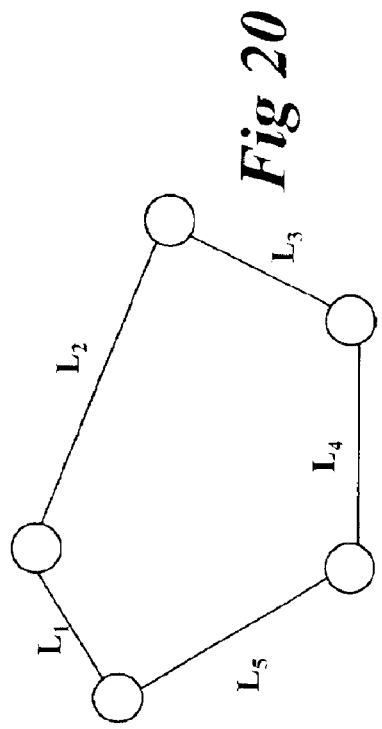
Fig 20
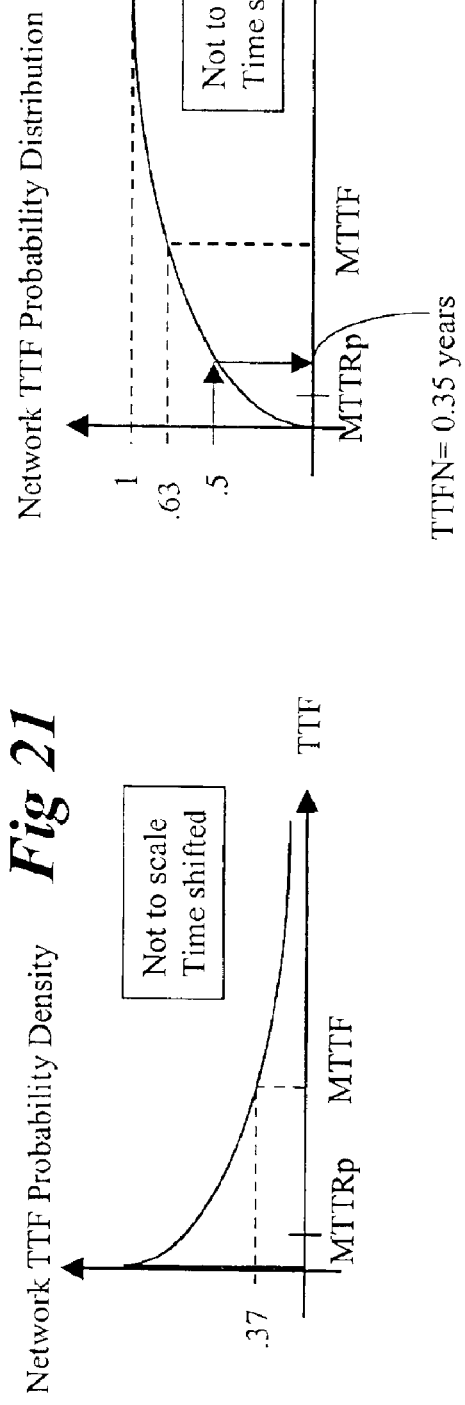
Fig 21
Fig 22

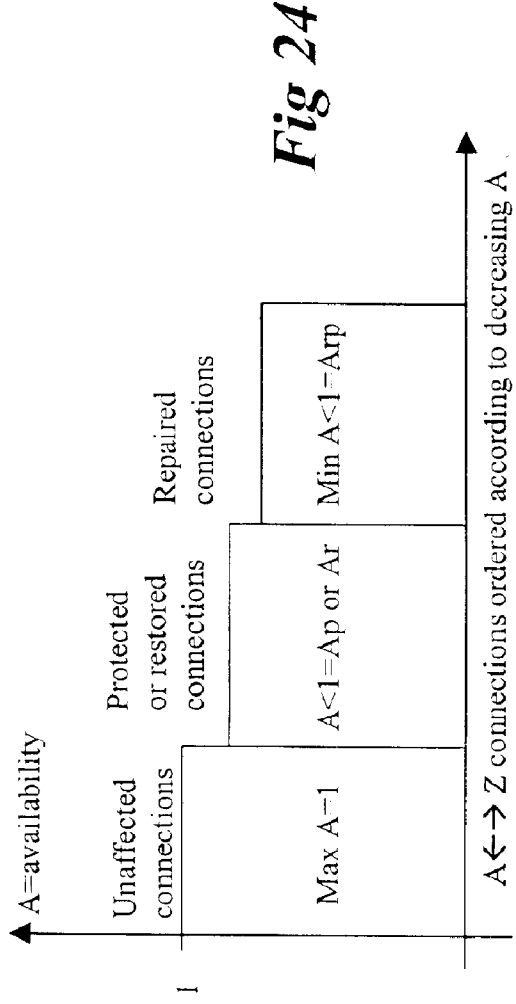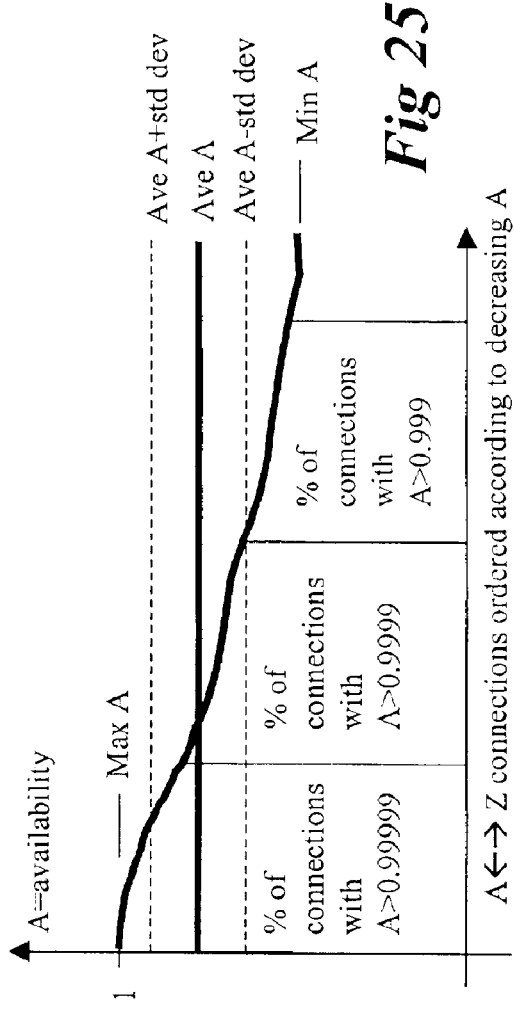

TIME SIMULATION TECHNIQUES TO DETERMINE NETWORK AVAILABILITY

CROSS REFERENCE TO RELATED APPLICATIONS

This application is a continuation-in-part of U.S. patent application Ser. No. 09/709,340 filed Nov. 13, 2000, entitled "Time simulation techniques to determine network availability."

FIELD OF INVENTION

The invention is in the area of communications network analysis. In particular, it is directed to simulation techniques for analyzing the availability or unavailability of end-to-end network connections or services.

BACKGROUND OF INVENTION

Capacity planning is an important function in designing and provisioning communication networks. While network link and node capacities have been estimated for years, there has been relatively little study of availability, especially for large mesh networks. Large mesh networks with multiple nodes and links, and with arbitrary topology, are not very amenable to an exact analysis, especially for multiple failures. The multiple failure case means that, in a typically large span of control, by the time another failure occurs, repair processes for at least one previous failure have not completed, so that there may be more than one failure to deal with at any one time. Simple structured point-to-point or ring networks, for example, may have 1—1 or ring protection mechanisms for single failures, e.g., a single fiber cut at a time. The single failure case means that, in a typically small span of control, by the time a second failure occurs, repair processes for the first failure have completed, so that there is no more than one failure to deal with at any one time. In typically route or geographically constrained networks of this kind, analytical and approximate techniques can give insight and understanding of service availability for each of any possible single failures. If, however, the network is unstructured like a mesh, if the number of nodes is large, and if multiple failures are considered, the calculations, even if approximate, quickly become very complicated.

An article entitled "Computational and Design Studies on the Unavailability of Mesh-restorable Networks" by Matthieu Cloqueuer and Wayne D. Grover on Proceedings of DRCN '2000, April 2000, Munich describes computational techniques of unavailability of a mesh network for single and multiple (mainly two) failures As mentioned in the above article, network availability generally refers to the availability of specific paths (also called connections) and not that of a whole network. Networks as a whole are never entirely up nor entirely down. "Network availability" can be defined as the average availability of all connections in a network but this gives less insight and comparative value than working with individual paths, or perhaps a selection of characteristic reference paths. Therefore, service availability between source and sink nodes is more meaningful to communications users who pay for such services.

For a quantitative study of network availability, FIG. 1 illustrates service on a specific path as down (unavailable) in durations U1, U2, U3, . . . Un along the time axis. On the vertical axis (U=unavailability), 'u' indicates the service as unavailable, and 'a' as available. Service availability over a period T is the fraction of this period during which the service is up. Therefore, service availability and unavailability are defined as follows:

$$\text{Availability} = \lim \{(T - \Sigma U_i)/T\} = MTTF/(MTTR + MTTF)$$

$$\text{Unavailability} = 1 - \text{Availability} = MTTR/(MTTR + MTTF)$$

Where, MTTR is the mean time to recover or repair, and MTTF is the mean time to failure. Recovery is by relatively fast means of network protection (in tens of milliseconds) or restoration (perhaps within a second) capabilities, whereas repair is much longer (typically hours).

The above referenced article discusses computational approaches for analyzing availability under a two-failure scenario. Such approaches are quite complex.

There is need for faster and easier techniques to determine service availability, especially in large mesh networks. Simulation provides tractability for large networks, and is also a good check on the accuracy of simple, approximate or analytical methods. Thus, the time simulation technique is a relatively easier and faster process that complements more insightful analytical approaches to availability.

SUMMARY OF INVENTION

According to the basic concept, the present invention is a time simulation technique for determining the service availability (or unavailability) of end-to-end network connections (or paths) between source and sink nodes. In accordance with one aspect, the invention is directed to a simulation technique to determine network unavailability or availability.

In accordance with one—the single failure—aspect, the invention is directed to a time simulation method of determining service availability of a communications network having a plurality of nodes and a plurality of links. The same principles can be applied to mesh networks or to other networks, such as ring networks. The method includes steps of: (a) selecting a link to fail; (b) performing a simulated link failure on the selected link; (c) selecting a connection between a network source and sink node pair; and (d) determining and summing the unavailability and availability of the connection under the simulated link failure condition. The method further includes steps of: (e) repeating (c) until all or a predetermined number of connections have been selected; and (f) repeating (a) and (b) until a simulated link failure has been performed on all links; or until the summed unavailability and availability has been determined to converge, whichever is earlier. (A convergence process may be used, for example, if an operator deems there to be too many failure scenarios to consider exhaustively, or it is too time consuming to consider all failure scenarios exhaustively.)

In accordance with another—the multiple failure—aspect, the invention is directed to a time simulation method of determining service availability of a communications network having a plurality of nodes and a plurality of links. The same principles can be applied to mesh networks or to other networks, such as ring networks. The method includes steps of: (a) initializing all counters; (b) initiating a simulated network failure process; (c) maintaining failure, repair and unavailability timing (d) selecting a link to which the network failure applies; (e) initiating recovery, repair and unavailability timing; (f) selecting a connection between a network source and sink node pair; and (g) determining and summing the unavailability and availability of the connection under the simulated link failure condition. The method further includes steps of: (h) repeating (f) until a predetermined number of connections have been selected; and (i) repeating (b) to (d) until a simulated link failure has been performed on all links; or until the summed unavailability and availability has been determined to converge, whichever is earlier.

In accordance with a further aspect, the invention is directed to a time simulation apparatus for determining service availability of a mesh or other communications network. The apparatus includes a network representation having pluralities of nodes, links and connections; each plurality having various attributes such as relating to failure, recovery and repair mechanisms. The apparatus further includes a mechanism for selecting one instance from each of the pluralities of nodes, links and connections based on the attributes; a failure/repair module for performing a simulated failure and repair on the selected instances as appropriate; a mechanism for selecting a connection between source and sink nodes; and an arithmetic mechanism for calculating availability of the selected connection.

Other aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF DRAWINGS

Embodiments of the invention will be described with reference to the accompanying drawings, wherein:

FIG. 20 shows a simple network for the purpose of illustrating the network TTF aspect of the invention, similar to FIG. 14 except that the failure could be anywhere.

FIG. 21 is a graph showing an example exponential TTF probability density for FIG. 20.

FIG. 22 is a graph showing a cumulative probability distribution generated from FIG. 21, and showing selection of a network TTFN.

FIG. 24 is a hypothetical display of expected simulation results after one or very few link failures, according to an embodiment of the invention.

FIG. 25 is a hypothetical display of expected results after most or all link failures, according to an embodiment of the invention.

DETAILED DESCRIPTION OF PREFERRED EMBODIMENTS OF INVENTION

Figure 1:
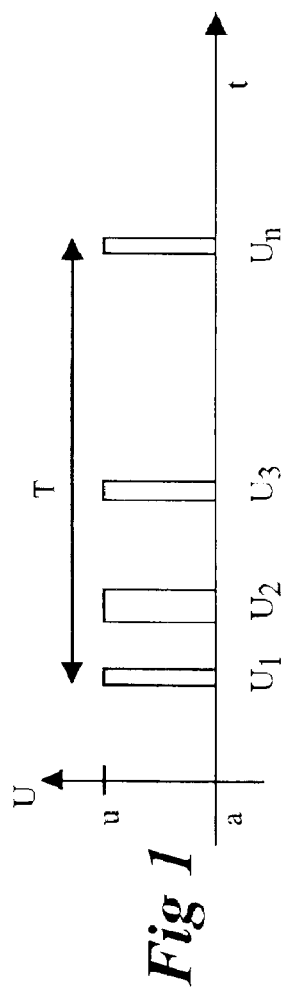
FIG. 1 is a time-related graph in which periods of unavailable service are shown.
Figure 2:
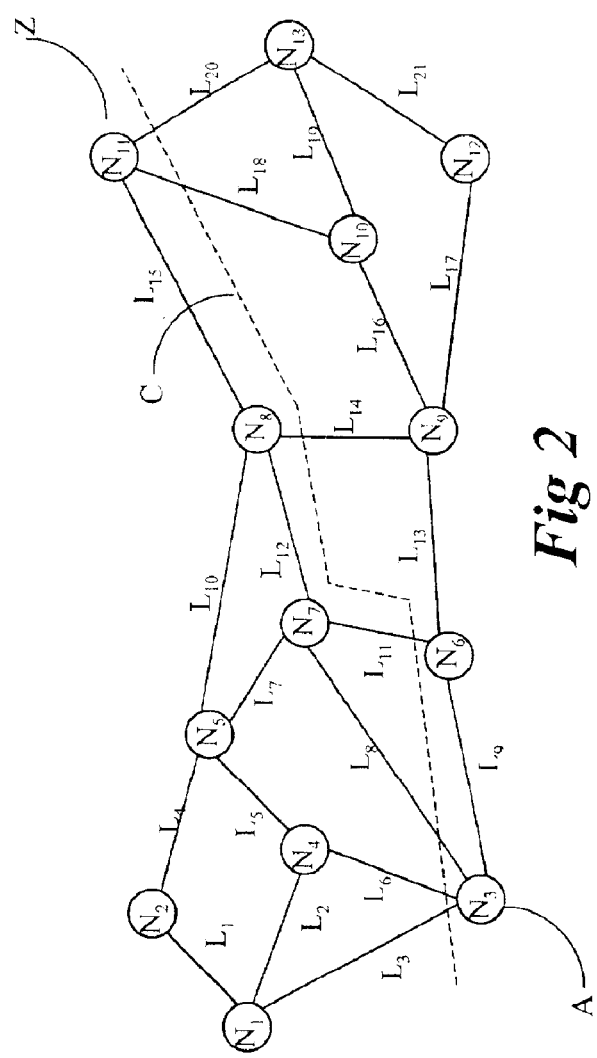
FIG. 2 shows a meshed network with links and nodes, also showing a path or connection between source node A and sink node Z.

Referring to FIG. 2, a network has a plurality of nodes $N_1$–$N_{13}$ and links $L_1$–$L_{22}$. An embodiment of the present invention considers the service availability (unavailability) between specific source and sink nodes. The service availability of a connection depends on not only the availability of each link in the connection, but also that of all other links, because failure of any link may affect the availability of the connection under consideration—that is, other failed links may prevent successful recovery (protection or restoration) of the connection.

In FIG. 2, it is assumed that connections are already provisioned. The problem therefore can be stated as follows.

There are N nodes and L links in the network, each link having length di. There are C connections or paths between source-sink node pairs of type A ($N_3$) and Z, ($N_{11}$) each connection using lj links and containing Path Inter mediate Nodes such as $N_6$. The connection distance CD is the sum of di's over lj links per connection. The total network link distance TD is the sum of di's over L network links.

Figure 3:
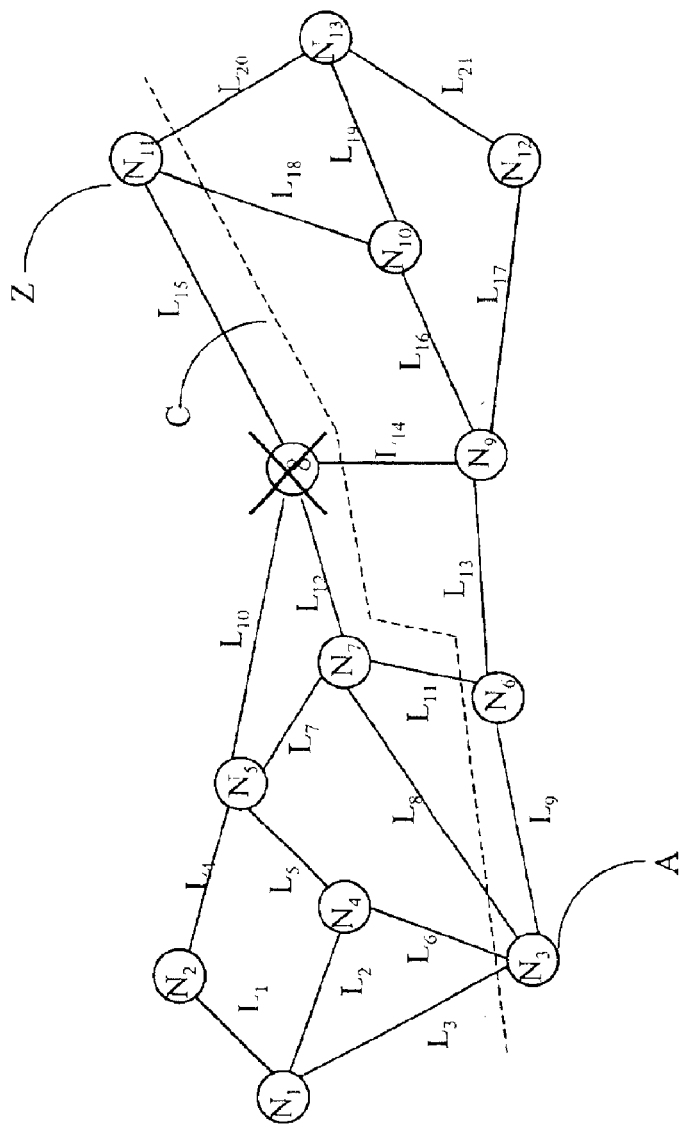
FIG. 3 shows a meshed network with links and nodes, also showing a path or connection between source node A and sink node Z with failure of node 8, and also showing a table of connections versus links and nodes in the connections.

Each connection is affected by various link and/or node failures. For example, per the table in FIG. 3, the connection from $N_3$ to $N_{11}$ can be made by $L_9$, $L_{11}$, $L_{12}$ and $L_{15}$ and $N_3$, $N_6$, $N_7$, $N_8$ and $N_{11}$. Alternatively, the connection between $N_3$ and $N_{11}$ could be made by $L_9$, $L_{13}$, $L_{16}$ and $L_{18}$ and $N_3$, $N_6$, $N_9$, $N_{10}$ and $N_{11}$. The connection from $N_1$ to $N_{13}$ can be made by $L_2$, $L_5$, $L_{10}$, $L_{15}$ and $L_{20}$ and $N_1$, $N_4$, $N_5$, $N_8$, $N_{11}$ and $N_{13}$. Referring to FIG. 3 the example network emulates node failure by simultaneous failure, and simultaneous repair, of all link connecting to that node. For example, failure of $N_8$ is equivalent to simultaneous failure of connecting $L_{10}$, $L_{12}$, $L_{14}$ and $L_{15}$. In this case the connection between nodes A and Z would be rerouted through $N_9$ and $N_{10}$ instead of through $N_7$ and $N_8$.

The simulation goal is to determine how the link failure process affects the connection availability between nodes A and Z. As mentioned earlier, the availability is defined as:

Connection unavailability=$U=MTTR/(MTTF+MTTR)$,

Connection availability=$1-U=MTTF/(MTTF+MTTR)$,

Where, MTTF is an average failure rate of F fiber cuts/(1000 km*year) and MTTR is either MTTRc (recovery time for effective protection/restoration) or MTTRp (repair time for no, or ineffective, protection/restoration). Recovery indicates protection or restoration, and restoration implies any reasonable routing algorithm, e.g., least cost, shortest path, etc., per operator preference.

Some examples are as follows:

If F=2 fiber cuts/(1000 km*year) and distance D=5000 km, MTTF=1000/(2*5000)=0.1 years=36.5 days.

For the same link as above, if 50 ms is needed for effective protection; U=[0.05/(3600*24]/[36.5+0.05/(3600*24)]=<0.000002%; A=1−U=>99.999998%~8 nines.

For the same link as above, if 500 ms is needed for effective restoration; U=[0.5/(3600*24]/[36.5+0.5/(3600*24)]=<0.00002%; A=1−U=>99.99998%~7 nines.

For the same link as above, if 8 hours is needed for repair under no or ineffective protection/restoration; U=(8/24)/(36.5+8/24)=<0.9%; A=1−U=>99.1%~2 nines.

Figure 4:
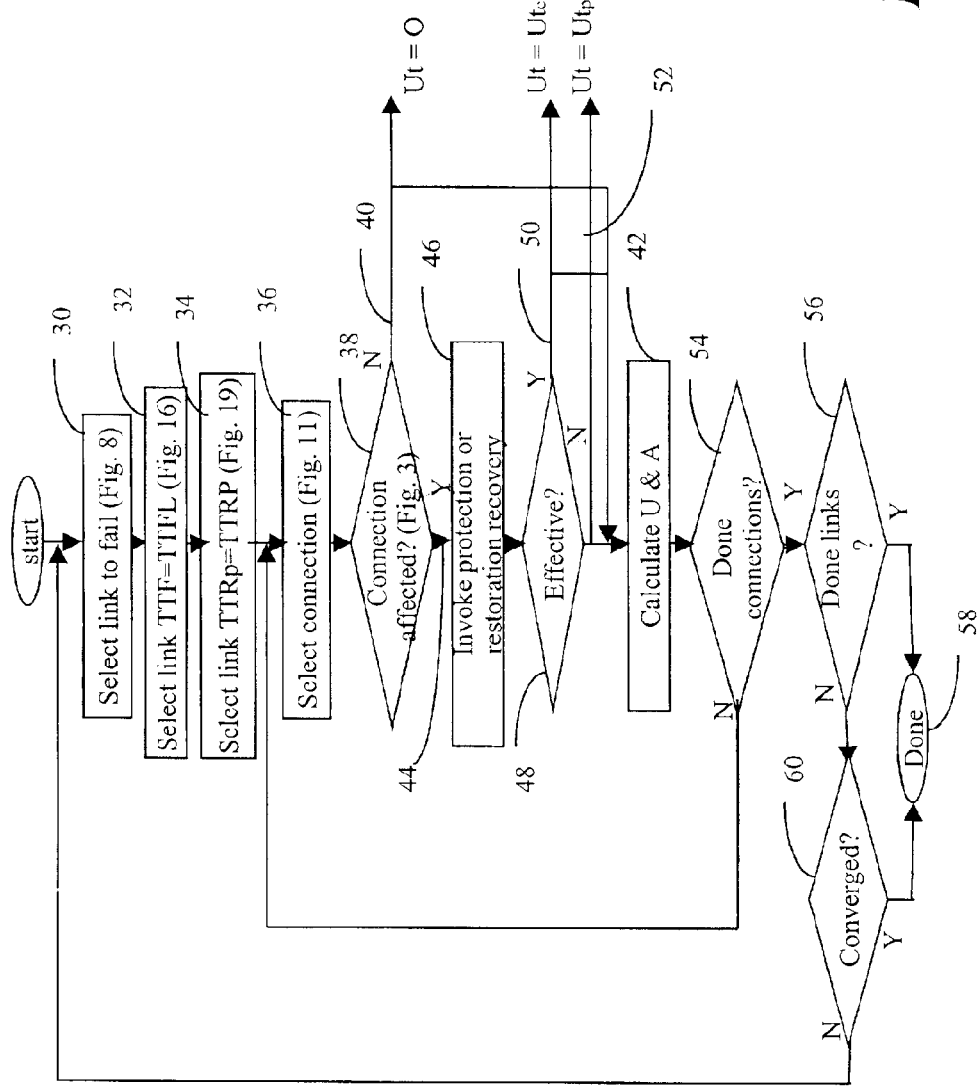
FIG. 4 is a flow diagram of the simulation technique according to one—the single failure—embodiment of the invention.
Figure 8:
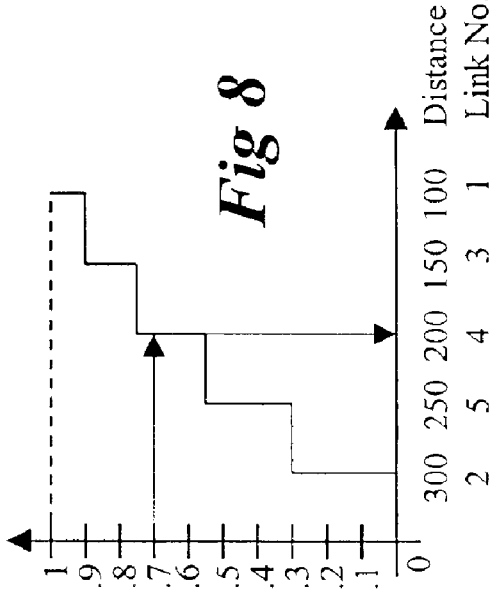
FIG. 8 is a graph showing the cumulative probability of links generated from FIG. 7, and showing selection of a link to fail.
Figure 16:
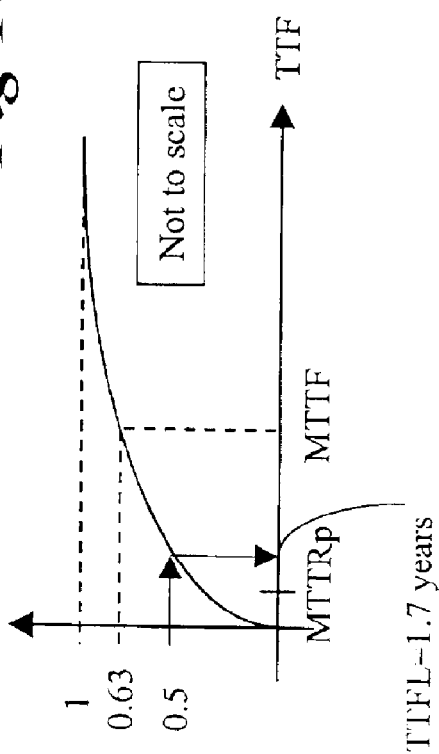
FIG. 16 is a graph showing a cumulative probability distribution generated from FIG. 15, and showing selection of a link TTFL.
Figure 19:
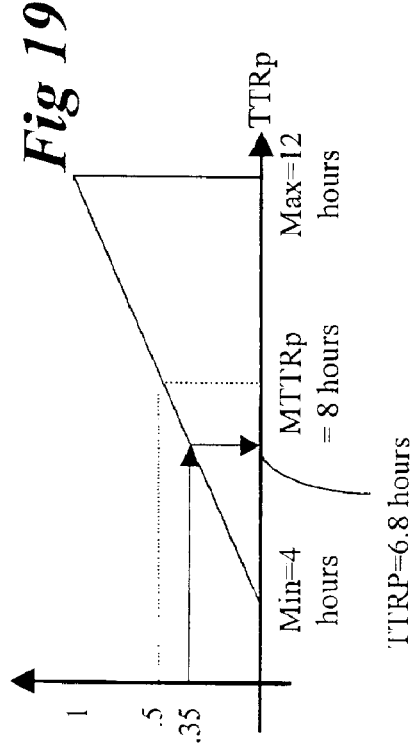
FIG. 19 is a graph showing a cumulative probability distribution generated from FIG. 18, and showing selection of a link TTRP.

FIG. 4 is a flow diagram of the algorithm according to the single failure embodiment of the invention. It is assumed that only link failures (F fiber cuts/1000 km per year) occur, since they tend to have a dominant effect on availability. Furthermore, only single link failures are considered in FIG. 4—multiple link failures are considered later in FIG. 5. Node failures are not specifically considered here but can be emulated by considering that all links emanating from a node fail simultaneously—a particular multiple failure scenario described previously with FIG. 3. Referring to FIG. 4, the simulation algorithm for the network under discussion runs as follows:

(1) At 30, randomly select a network link i to fail based on its link selection distribution (distance weighted, as described later with FIG. 8);

(2) At 32, randomly select network link i time to fail (TTFL) based on its TTF distribution (distance dependent, as described later with FIG. 16);

(3) At 34, randomly select link time to repair (TTRP) based on its TTRp distribution (as described later with FIG. 19). (Note that one can also select times to recover (TTRC) based on a TTRc distribution. But recovery times tend to be quite small and less variable compared to repair times. So, here recovery times are fixed, e.g., at 50 ms for protection, or e.g., at 500 ms for restoration.)

Figure 11:
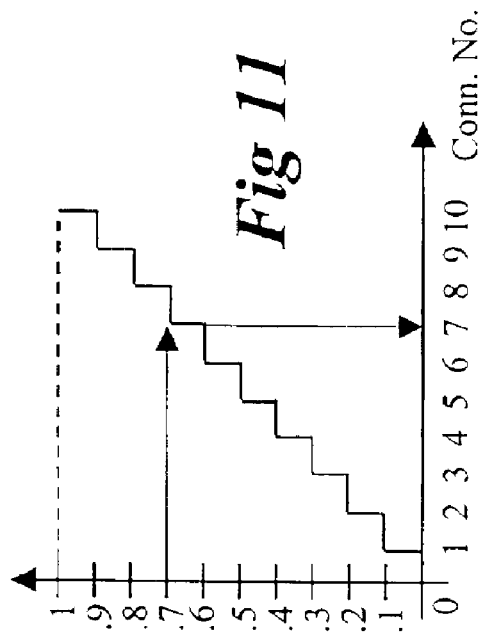
FIG. 11 is a graph showing the cumulative probability of connections generated from FIG. 10, and showing selection of a connection.

(4) At 36, select a connection (connection selection can be, e.g., sequential, based on priority, or random from a connection selection distribution, as described later with FIG. 11);

(5) At 38, decide if the selected connection is affected or not by the selected link to fail in (1) above—i.e., this is apparent from a table such as in FIG. 3;

(6) At 40, if the connection is unaffected, accumulate unavailable time Ut=0 for this failure on this connection, and proceed with cumulative calculation of connection U and A (unavailability and availability) at 42 (cumulating will begin for subsequent failures);

(7) At 44, if the connection is affected, invoke the failure recovery scheme at 46 to determine whether or not the failure recovery scheme is effective at 48;

At 50, if effective, accumulate unavailable time Ut=Utrecover for this affected connection and calculate cumulative connection U and A at 42;

At 52, if ineffective, accumulate unavailable time Ut=Utrepair for this affected connection and calculate cumulative connection U and A at 42;

(Note, the failure recovery scheme will be by means of separate processes for either protection or restoration, related to the capacity planning process for allocating protection or restoration bandwidth, and for switching links or rerouting connections over this bandwidth to avoid failures.)

(8) At 54, if not all the connections have been selected, go back to 36 to repeat for all connections (or for any subset of connections, per operator preference), continue to calculate Ut=0, or Utrecover, or Utrepair, as applicable, for each connection and calculate cumulative connection U and A at 42;

(9) At 56, determined if all links (or sufficient links, or specified links, per operator preference) have been selected to fail at least once (or more often, per operator preference);

if yes, end at 58;

if no, determine if A (and because of the equation U=1−A, also U) converges to a constant value, (e.g., per operator preference and to save simulation time, if U and A are changing so little after simulating an additional link, or are already adequate enough to not warrant further simulation), by convergence to a constant value, it is meant that the availability remains substantially the same after an additional simulation including an additional link;

(10) At 60, if A converges to a constant, end at 58;

if no, go back to 30 to select another link to fail and repeat the procedure for all or desired subset of links, per operator preference, or until converged.

Figure 5:
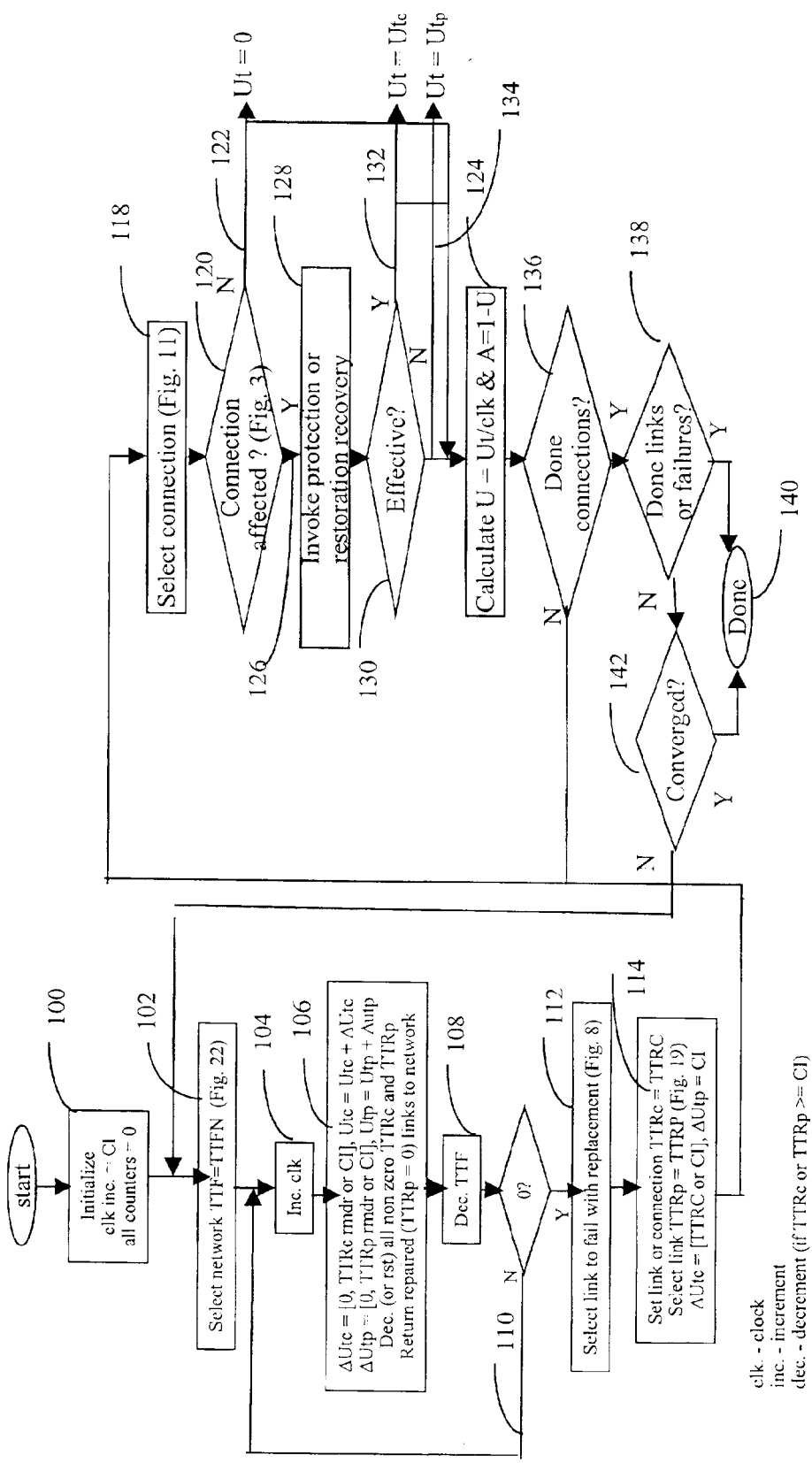
FIG. 5 is a flow diagram of the simulation technique according to another—the multiple failure—embodiment of the invention.

FIG. 5 is a flow diagram of the algorithm according to the multiple link failure embodiment of the invention. Referring to FIG. 5 the simulation algorithm for this network runs as follows:

(1) At 100, initialize clock increment to CI, and all other counters to 0.

(2) At 102 randomly select a network time to fail (TTFN) based on the network TTF distribution (as described later with FIG. 22), with MTTF based on the entire network's link distance TD, i.e., MTTF=1000/(F*TD)

(3) At 104 increment clock.

(4) At 106 do on-going per clock increment book-keeping functions as follow:

Calculate incremental unavailable times due to recovery (ΔUtc) and repair (ΔUtp). These incremental times will either be zero, TTRc and TTRp remainders if TTRc and TTRp are less than CI but non-zero, or CI if TTRc and TTRp equal or exceed CI.

Calculate cumulative unavailable times due to recovery (Utc) and repair (Utp).

Decrement all non-zero times to recover (TTRc) and repair (TTRp) if these times equal or exceed a clock increment, or reset all these non-zero times if they are less than a clock increment.

Return repaired links to the network. A link is returned when either a single per link TTRp counter equals 0 after repair of single failures or after serial repair of multiple failures with a single crew, or when all per link TTRp counters equal 0 after concurrent repair of multiple failures with multiple crews.

(5) At 108 decrement TTF. Decide if TTF equals 0.
(6) At 110 if TTF does not equal 0 go back to 104 to increment the clock, do book-keeping and return repaired links to the network.
(7) At 112 if TTF does equal 0, select a network link to fail as a result of the failure process initiated in (2). This is done with replacement since with multiple failures, a given link can fail again before a current and/or some previous failures on that link are repaired.
(8) At 114 set link or connection time to recover TTRc= TTRC. (This is a link or connection value, depending on whether the recovery scheme is link or connection based.) There is a minimum of one TTRc counter and one initial value TTRC if identical for all links or connections, or as many as needed if not identical. Similarly for incremental (ΔUtc) and cumulative (Utc) unavailability counters.
(9) At 114 also randomly select link time to repair (TTRP) based on its TTRp distribution (as described later with FIG. 19). For a given link, add the new TTRP to the current TTRp counter for serial repair of multiple failures with a single crew, or create another TTRp counter per failure for concurrent repair of multiple failures with multiple crews.
(10) At 118 select a connection (connection selection can be, e.g., sequential, based on priority, or random from a connection selection distribution, as described later with FIG. 11);
(11) At 120 decide if the selected connection is affected or not by the link failure in (7).
(12) At 122 if the connection is unaffected accumulate unavailable time Ut=0 for this failure on this connection and calculate cumulative connection U and A at 124.
(13) At 126 if the connection is affected, invoke the failure recovery scheme at 128 to determine whether or not the failure recovery scheme is effective at 130.

At 132, if effective, accumulate unavailable time Ut=Utrecover for this affected connection and calculate cumulative connection U and A at 124.

At 134, if ineffective, accumulate unavailable time Ut=Ut repair for this affected connection and calculate cumulative connection U and A at 124.

(14) At 136 if not all the connections have been selected go back to 118 to repeat for all connections, continue to calculate Ut=0, or Utrecover, or Utrepair, as applicable, for each connection and calculate cumulative connection U and A at 124.
(15) At 138 determine if all links (or sufficient links, or specified links per operator preference) have been selected to fail at least once. If yes end at 140. If no, determine if U and A converge.
(16) At 142 if converged end at 140. If not go back to 102 to select another network time to fail and repeat the procedure for all failure combinations or until converged.

Link to Fail Selection

Per operator preference, there are many ways to select a link to fail, e.g., sequentially, randomly, all or selected subset, from experience, etc. However, based on the characteristic of F fiber cuts/(1000 km*year), a longer link is more likely to fail, so, as one example, the link distance (di) weighted probability is used to select a link to fail. The selection probability=di/TD (the ratio of link distance di, to total network link distance TD). At 30 in FIG. 4 and at 112 in FIG. 5, links are selected according to these probabilities. In this way, longer links get selected with correspondingly higher probability. For example, if one link has twice the distance of another, the probability that that link is selected is twice that of the other.

Per operator preference, selection could be with replacement (since with multiple failures—FIG. 5, a given link can fail again before a current and/or some previous failures on that line are repaired), or without replacement (e.g., with single failures—FIG. 4, or to speed simulation time and/or to have more links covered).

Figure 6:
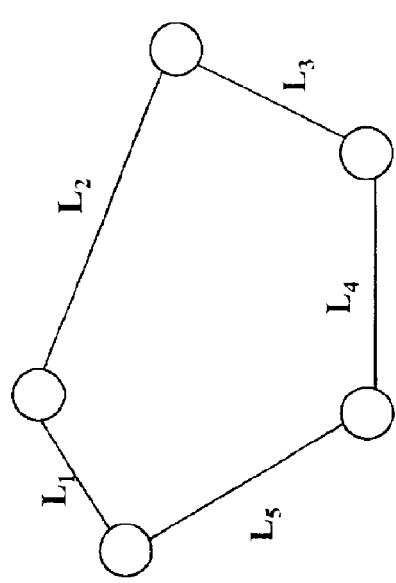
FIG. 6 shows a simple network for the purpose of illustrating the link to fail selection aspect of the invention.

To illustrate selection of links to fail, FIG. 6 shows a simple network with link parameters as follows:

| Link No. i | Distance di km | Probability of selection = di/TD |
|---|---|---|
| 1 | d1 = 100 | 0.1 |
| 2 | d2 = 300 | 0.3 |
| 3 | d3 = 150 | 0.15 |
| 4 | d4 = 200 | 0.2 |
| 5 | d5 = 250 | 0.25 |
| Total | TD = 1000 | 1 |

Figure 7:
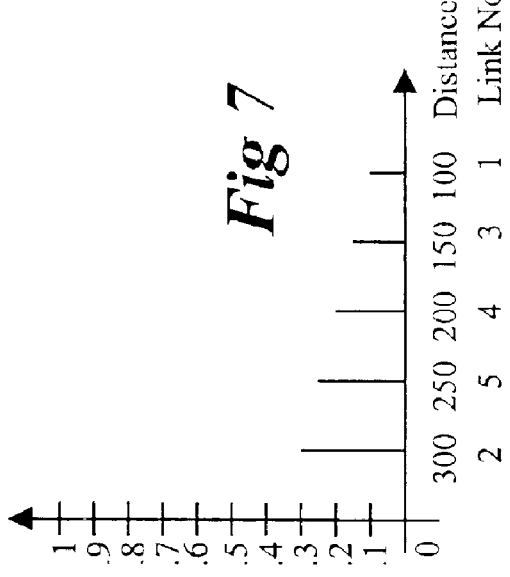
FIG. 7 is a graph showing an example probability density of links based on their length.

In the table above, link numbers and their distances are shown together with their distance-weighted probability of selection di/TD. FIG. 7 is a graph showing the probability density of link selection vs link distance. FIG. 8 shows the cumulative probability distribution of link selection derived from FIG. 7. (In FIGS. 7 and 8, the X-axis happens to show link distance ordered from longest to shortest, but this ordering is not necessary.) A uniform random number generator drives the link selection mechanism, that is, the generator generates a random number between 0 and 1 shown on the Y axis and selects a corresponding link shown on the X axis. For example, a random number of 0.7 would select link No. 4, as shown in FIG. 8.

Although this is one way of selecting links to fail, other criteria can be considered per operator preference. For example, link infrastructure type (aerial versus buried) or location (city versus country) may be more critical to fiber cuts than just link distance. In such cases, more or less weight is given to certain links and corresponding alternatives to FIGS. 7 and 8 can be derived and used.

Connection Selection

Per operator preference there may be many ways to select a connection to fail.

Here, for simplicity, all connections are randomly selected without replacement. This can be done using a uniform density and corresponding linear distribution of connections, together with a random number generator for selection, entirely similar in principle to the other selection processes already discussed above.

Figure 9:
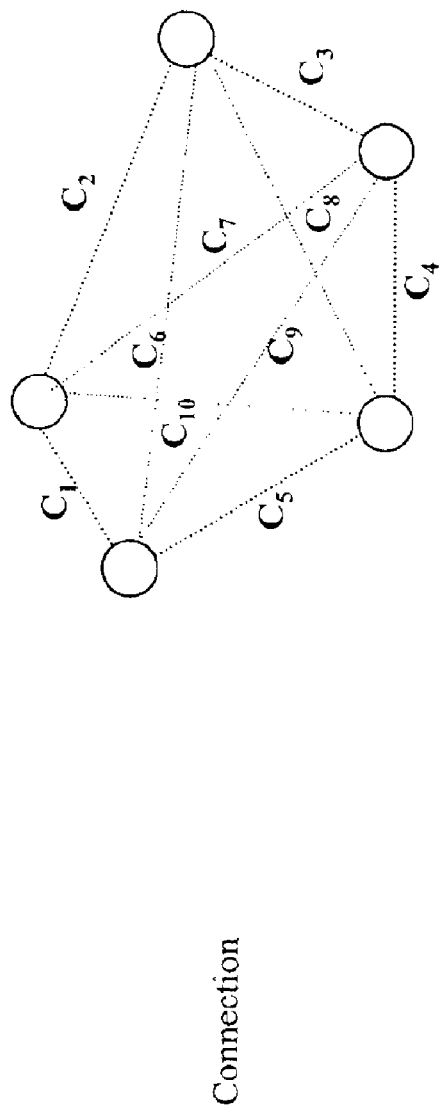
FIG. 9 shows a simple network for the purpose of illustrating the connection selection aspect of the invention.
Figure 10:
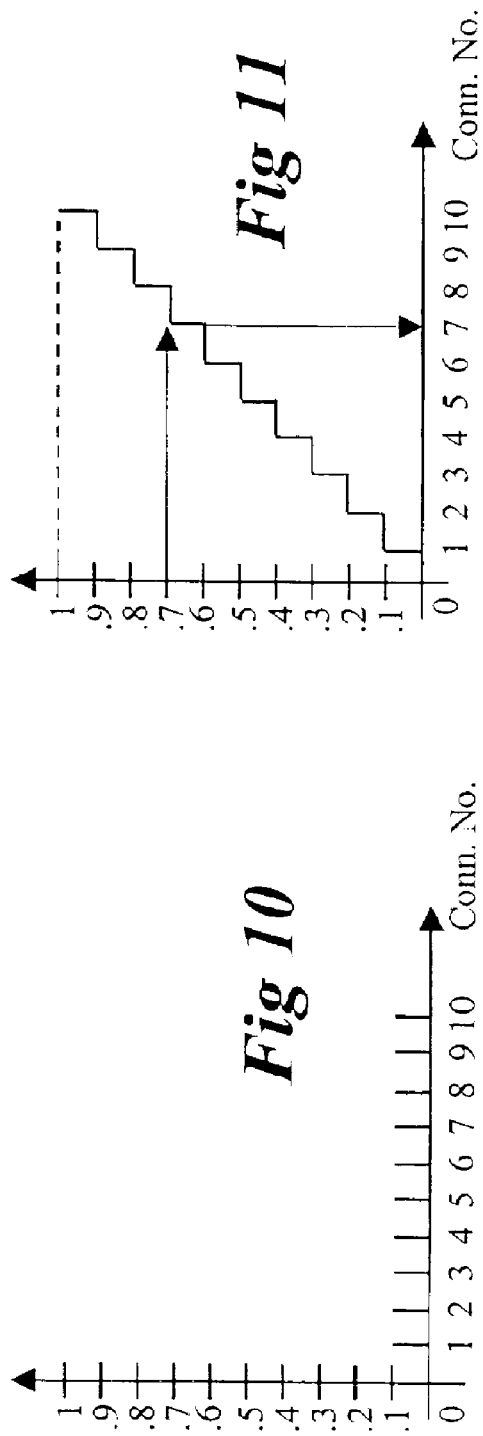
FIG. 10 is a graph showing an example uniform probability density of connections.

FIG. 9 shows a simple example network with connections $C_1$–$C_{10}$ identified. FIG. 10 is a graph showing a uniform probability density of connection selection versus connection number. FIG. 11 shows the cumulative probability distribution of connection selection derived from FIG. 10. A uniform random number generator drives the link selection mechanism, that is, the generator generates a random number between 0 and 1 shown on the Y axis and selects a corresponding connection shown on the X axis. For example, a random number of 0.7 would select $C_7$ as shown in FIG. 11.

Although this is one way of selecting connections to fail other criterion can be considered per operator preference. Also, how connections are selected may effect availability results. For instance, under multiple failure conditions, connections selected earlier have a better chance of recovering and of having higher availability than those selected later.

Thus, connections can be selected according to various criteria, per operator preference, that is: sequentially, randomly, with/without priority, (e.g., if being used for mission critical vs best effort traffic), all, or a specific subset (e.g., of reference connections), etc. Accordingly, more or less weight can be given to certain connections and corresponding alternatives to FIGS. 10 and 11 can be derived and used.

Link Time to Fail (TTF) Selection

Figure 12:
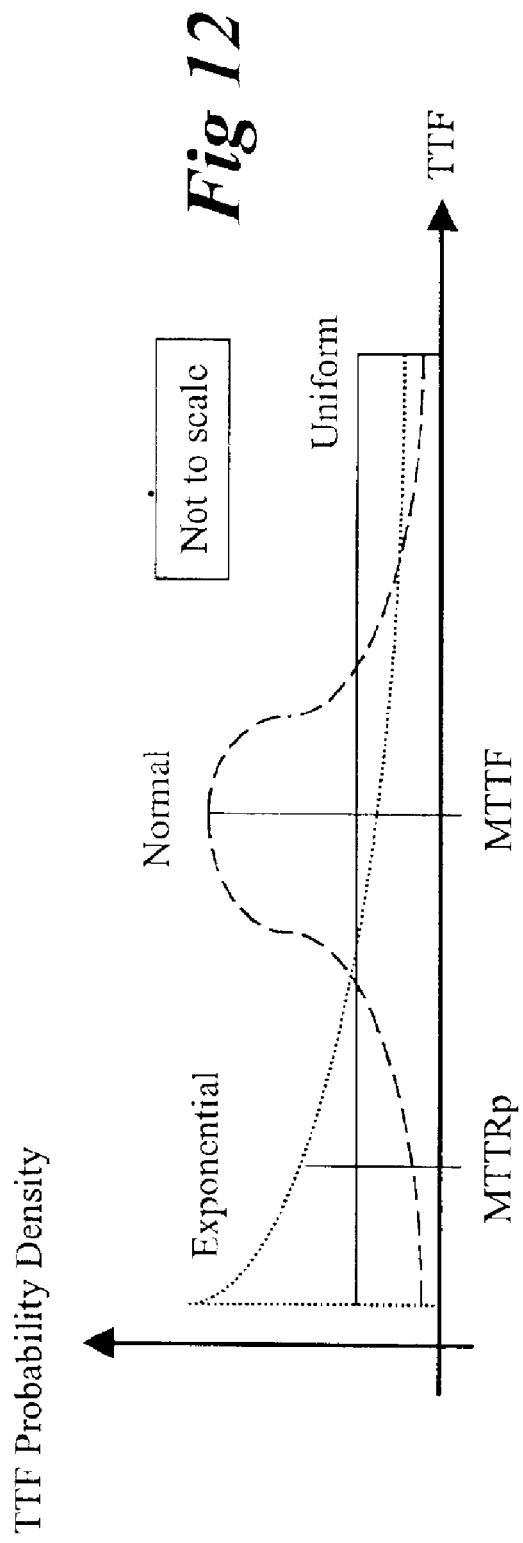
FIG. 12 shows example probability densities of TTF (time to failure).
Figure 13:
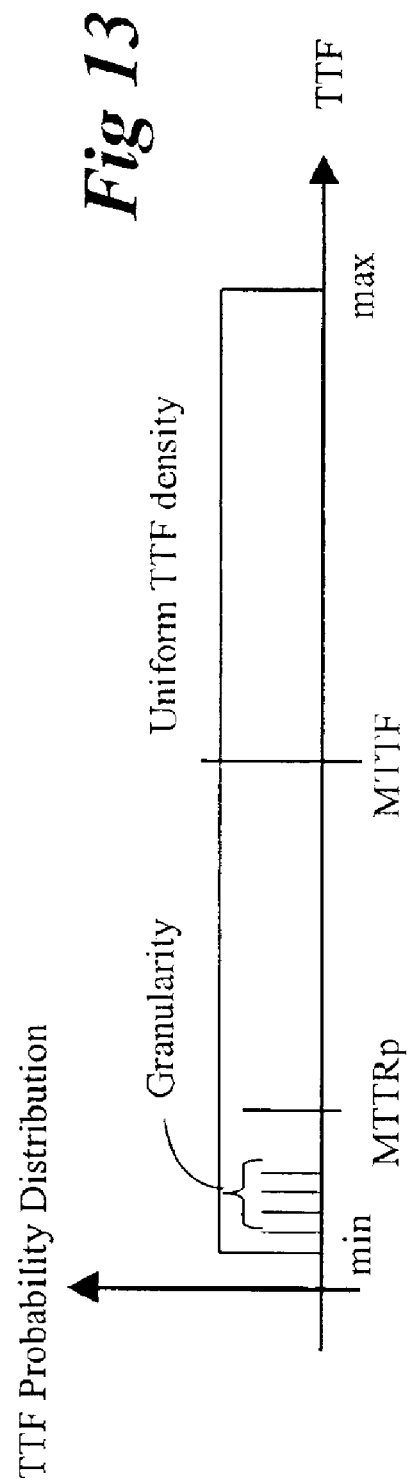
FIG. 13 is a uniform TTF probability density to illustrate details.

Like the link selection mechanism discussed above, a random number generator generates a random number, which selects a TTFL from a link TTF distribution with MTTF. Distributions are preferably based on operator experience, but can be any distribution per operator preference. Example TTF densities are uniform, normal, exponential, etc., as shown in FIG. 12. FIG. 13 shows a generalized uniform TTF density to explain some of the parameters in more detail. For fiber cuts, MTTF=1000/ (F*di), where F is the average number of fiber cuts per year and di is the link fiber length in km. The uniform density ranges from "min" to "max", where "min">=0 and "max"= 2MTTF-min<=2MTTF. The density on the Y-axis is determined by 1/(max-min)=1/[2(MTTF-min)]>=1/(2MTTF).

Another critical aspect of the link TTF density is if times to failure can be smaller than link times to repair (TTRp—repair time selection is discussed later). For TTF>TTRp, only single failure cases will occur (as explained and addressed earlier in FIG. 4), but if TTF<TTRp, multiple failures can occur and have a relatively higher impact on availability (as explained and addressed earlier in FIG. 5). The granularity of TTF samples is preferably less than $\frac{1}{10}^{th}$ of minimum repair time, for reasonably accurate availability assessment during multiple failures.

Figure 14:
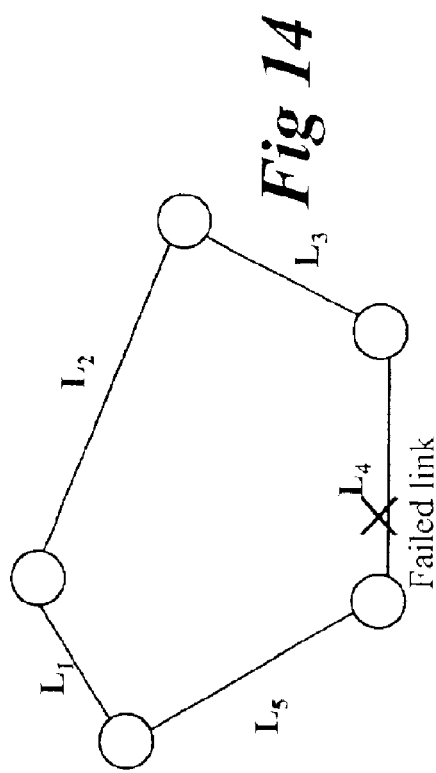
FIG. 14 shows a simple network for the purpose of illustrating the TTF aspect of the invention, similar to FIG. 6 except that it shows a fiber cut on link No. 4.
Figure 15:
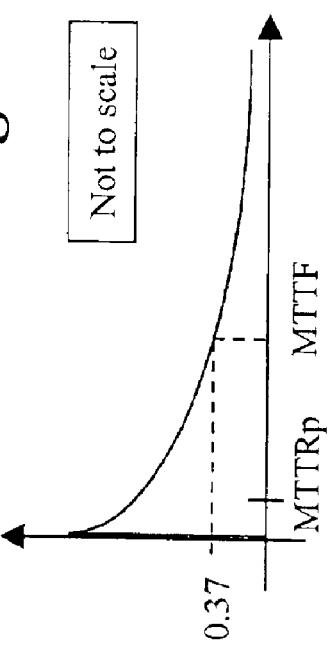
FIG. 15 is a graph showing an example exponential link TTF probability density.

Analogous to link selection discussed earlier, link TTF densities are used for TTF selection as follows. FIG. 14 is the same network as in FIG. 6 except that it shows a failure in link No. 4. Links are assumed to have an exponential TTF density as shown in FIG. 15. This density would approximately apply, for example, if an operator found that failures tended to bunch together in time. TTFL is selected as follows. FIG. 16 is the TTF cumulative probability distribution, corresponding to FIG. 15. In FIGS. 15 and 16, MTTF of link No. 4 is shown for reference. Link No. 4 has a distance of d4=200 km and has an average of F=2 fiber cuts per 1000 km per year. From MTTF=1000/(F*di), this translates to MTTF=2.5 years which corresponds to exponential probability of 0.63.

Like the selection mechanism for links, a uniform random number generator drives TTFL selection. For example, in FIG. 16, a random number of 0.5 selects TTFL=1.7 years for link No. 4.

As with link selection above, there may be different TTF distributions for different links under different conditions. The distribution for each link could be based on experience in terms of infrastructure type (aerial, buried), type of right-of-way (beside railroad, in pipeline), location (city, country), proneness to construction activity or disasters (accidents, floods, earth quakes), etc.

For the single failure case, once the TTFL value is determined, the selected link can be considered to fail immediately as in 32 in FIG. 4. However, for the multiple failure case, a network TTFN value is determined, a TTF counter is set to the TTFN value and is decremented every clock increment. The selected link is considered to fail when the counter reaches 0 as in 110 in FIG. 5

Link Time to Repair (TTRp) Selection

Figure 17:
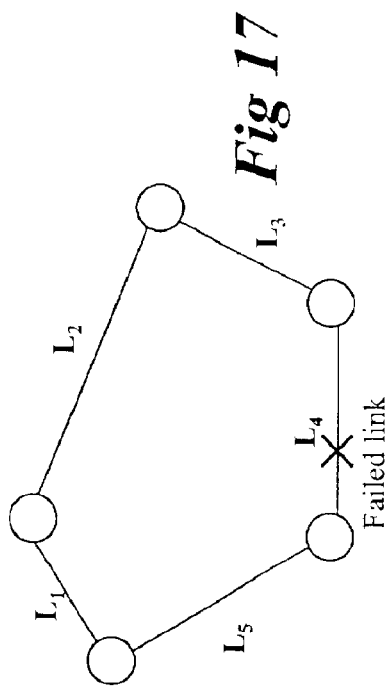
FIG. 17 shows a simple network for the purpose of illustrating the link TTRp (time to repair) aspect of the invention, similar to FIG. 6 except that it shows a fiber cut on link No. 4.
Figure 18:
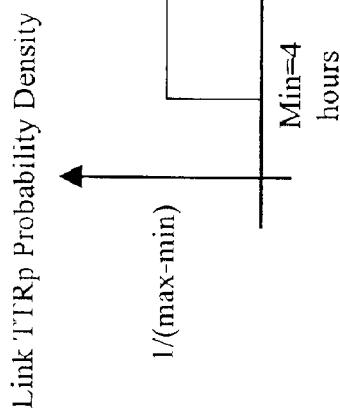
FIG. 18 is a graph showing an example uniform link $TTR_P$ probability density.

Analogous to TTF link selection discussed earlier, TTRp distributions are used for TTRP selection as follows. FIG. 17 again shows a failure of $L_4$ Links are assumed, as an example, to have a uniform TTRp as shown in FIG. 18. This density would approximately apply for example, if an operator found that repair times tend to vary considerably. TTRP is selected as follows. FIG. 19 is the TTRp cumulative probability distribution corresponding to FIG. 18. In FIGS. 18 and 19 MTTRp of $L_4$ is shown for reference. $L_4$ has an MTTRp of 8 hours which corresponds to a probability of 0.5.

Like the previously described link TTF selection mechanism, a uniform random number generated drives TTRp selection. For example, in FIG. 19, a random number of 0.35 selects TTRP=6.8 hours for $L_4$ As with link and TTF selections above, in generating the TTRp distribution, or distributions, per operator preference it is possible to account for numerous effects, e.g., demographics, infrastructure, age of equipment, seasonal and time-to-day effects, size of work force, etc.

For the single failure case, once the TTRP value is determined, the selected link can be considered repaired immediately as in 34 in FIG. 4. However, for the multiple failure case, once the TTRP value is determined, a link TTRp counter is started with the selected TTRP value and then is decremented every clock increment until the counter reaches 0 at which time the link is considered repaired and is returned to the network for service as in 106 in FIG. 5. Note that in multiple failure cases, there may be more than one such counter running at any one time.

As noted earlier, fixed times to recover (TTRC) are used (since recovery times are very small compared to repair times).

Network Time to Failure (TTF) Selection

FIG. 20 is the same network as in FIG. 6 and FIG. 14, but wherein the failure could be anywhere. Networks are assumed to have an exponential TTF density as shown in FIG. 21, though, as note earlier for link TTF, this density could differ, per operator preference. TTFN is selected as follows. FIG. 22 is the TTF cumulative probability distribution corresponding to FIG. 21. In FIGS. 21 and 22 a network MTTF is shown for reference. For example, the network is assumed to have a total link distance of TD=1000 km and an average of F=2 fiber cuts per 1000 km per year. From MTTF=1000/(F×TD), this translates to MTTF=0.5 years which corresponds to exponential probability of 0.63.

Like the previously described link TTF selection mechanism, a uniform random number generated drives TTFN selection. For example, in FIG. 22, a random number of 0.5 selects TTFN=0.35 years.

Figure 23:
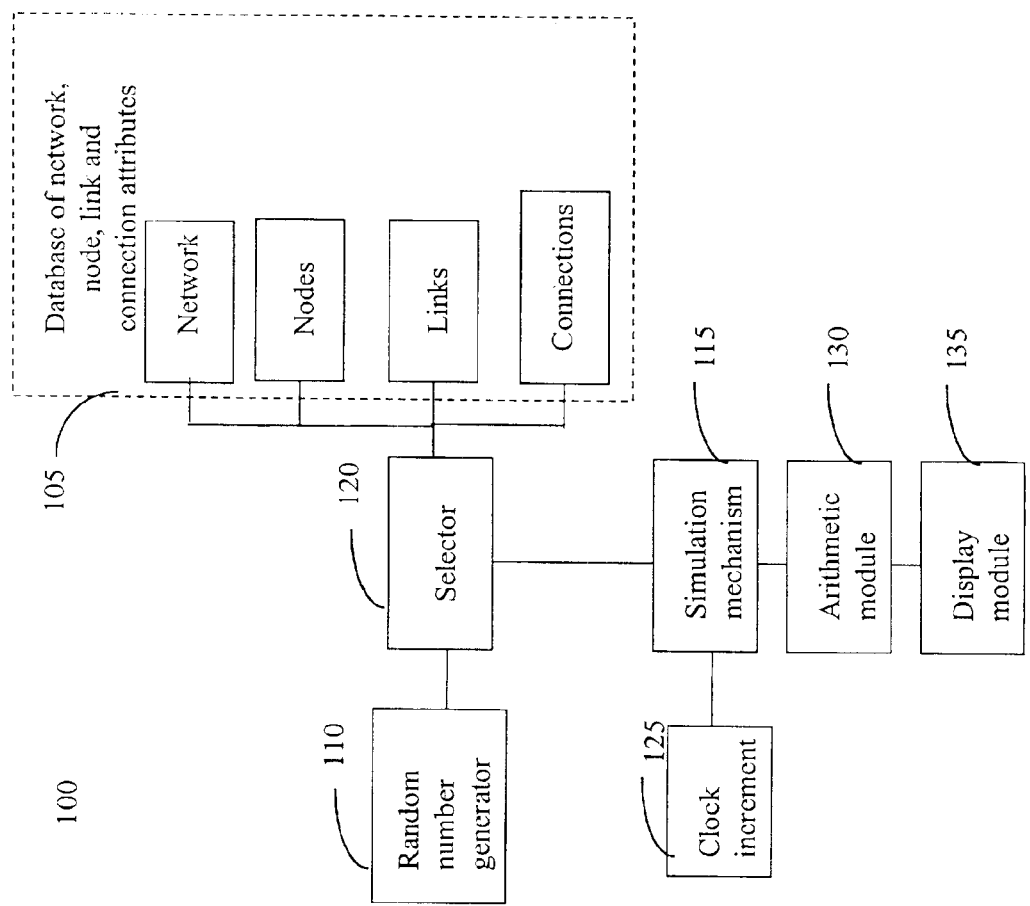
FIG. 23 is a schematic block diagram of the simulation technique according to one embodiment.

FIG. 23 is a block diagram of the simulation apparatus 100 according to the single and multiple failure embodiments of the invention.

Referring to FIG. 23, a database 105 holds data on the network, and on individual nodes, links and connections. As shown, the data identifies the network node, link and connection resources, and includes attributes like distances, selection criteria, failure, recovery and repair data, etc. as follows: Networks attributes include number of nodes N; number of links L; number of connections C; total link distance TD; selection criteria for failure and failure data such as F, MTTF and TTF selection criteria and distribution.

Nodes attributes include (when included in availability simulation) number of connecting links; which connecting links (i); selection criteria for failure; failure data such as FITs, MTTF, TTF selection criteria and distribution; recovery data if applicable such as the mechanism and TTRc; and repair data such as MTTRp and TTR selection criteria and distribution.

Link attributes include which connecting nodes; distance di; selection criteria for failure; failure data such as F, MTTF, TTF selection criteria and distribution; recovery data if applicable such as the mechanism, and TTRc; and repair data such as MTTRp and TTRp selection criteria and distribution.

Connection attributes include which source A and sink Z nodes; number of intermediate nodes; which intermediate nodes; which links in connection j; total distance CD, and recovery data, if applicable such as the mechanism and TTRc.

A generator 110 generates random numbers by which a selector 120 selects links, nodes, or connections, as well as failure and repair times as applicable, and by which selected connections are affected or not, according to the stored data concerning link, node and connection attributes. The link attributes includes the distance, TTF, TTRc, TTRp, etc. For example, once a link and a connection are selected, a simulation mechanism 115 performs simulated failure and restoration processes. Processes can be under the control of clock increments—necessary for the multiple failure case. The clock 125 generates clock increments, which are calibrated to correspond to a specific real time interval—for instance, one clock increment might be $\frac{1}{1000}^{th}$ of real time. An arithmetic module 130 calculates the availability or unavailability of the selected connection and thereafter the service availability of the network. Finally, the availability is displayed on a display module 135.

FIGS. 24 and 25 are hypothetical histograms of expected connection availability performance after the first few failures and after many failures, respectively. These results could be displayed on a display module. Over the simulation time, FIG. 24 migrates to FIG. 25, showing how each connection's availability is affected as more failures are encountered. FIG. 25 is an example of what may be a useful way for simulation results to be summarized and presented to an operator. For example, the average availability is an indication of the overall network availability, and it would also be evident how many and which connections provide high availability (e.g., at least 99.999%), etc. However, specific connections and their availability are also identifiable on the X-axis, for example, connections known by the operator to carry critical services. Further, it could be made possible for the operator to select any such connection and get a log of its simulation details, e.g., as to the route it took, its distance, number of hops it went through, which failures affected it, where they were, if there were multiple failures, if recovery was successful, etc.

While the invention has been described according to what are presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims must be accorded the broadest possible interpretation so as to encompass all such modifications and equivalent structures and functions.

What is claimed is:

1. A time simulation method of determining service availability of a network with multiple failures, said network having a plurality of nodes and a plurality of links, the method comprising steps of:
   a) selecting a network time to fail (TTF) based on the network TTF distribution;
   b) maintaining failure repair and unavailability timing;
   c) selecting a link between two network nodes;
   d) performing a simulated link failure on the selected link;
   e) selecting a connection between a network source node and a network sink node;
   f) determining and summing the unavailability and availability of the selected connection under the simulated link failure condition;
   g) repeating steps (e), and (f) for all connections of the network; and
   h) repeating steps (a) to (g) until either a link failure has been simulated on all links of the network or the summed availability has been determined to converge to a constant value, whichever is earlier.

2. The time simulation method according to claim 1 further comprising the step of:
   averaging the service availability across all connections to generate the service availability of the network.

3. The time simulation method according to claim 1 wherein all the above steps are performed in response to clock increments, which proportionately correspond to actual times.

4. The time simulation method according to claim 1, wherein the network has corresponding nodes and links, the links having attributes in relation to their characteristics with respect to simulated failures, recovery and repair processes, the method further comprising the step of:
   randomly selecting a link based on the attributes of the links.

5. The time simulation method according to claim 1, wherein the network has corresponding nodes and links, the links having attributes in relation to their characteristics with respect to simulated failures, recovery and repair processes, wherein the attributes are in relation to their distance, time-to-failure parameter, and time-to-recover/repair.

6. A computer readable medium containing program instructions for determining service availability of a communications network with multiple failures, said network having a plurality of nodes and a plurality of links, said medium comprising the instructions for:
   a) selecting a network time to fail (TTF) based on the network TTF distribution;
   b) maintaining failure repair and unavailability timing;
   c) selecting a link between two network nodes;
   d) performing a simulated link failure on the selected link;
   e) selecting a connection between a network source node and a network sink node;
   f) determining and summing the unavailability and availability of the selected connection under the simulated link failure condition;
   g) repeating steps (e), and (f) for all connections of the network; and
   h) repeating steps (a) to (g) until either a link failure has been simulated on all links of the network or the summed availability has been determined to converge to a constant value, whichever is earlier.

7. The computer readable medium according to claim 6, further comprising the instructions for:
   averaging the service availability across all connections to generate the service availability of the network.

8. The computer readable medium according to claim 6, wherein the network has corresponding nodes and links, the links having attributes in relation to their characteristics with respect to simulated failures, recovery and repair processes, the computer readable medium further comprising instructions for:

randomly selecting a link based on the attributes of the links.

9. A computer program for use on a computer system for a time simulation method of determining service availability of a network with multiple failures, said network having a plurality of nodes and a plurality of links, the method comprising steps of:

a) selecting a network time to fail (TTF) based on the network TTF distribution;

b) maintaining failure repair and unavailability timing;

c) selecting a link between two network nodes;

d) performing a simulated link failure on the selected link;

e) selecting a connection between a network source node and a network sink node;

f) determining and summing the unavailability and availability of the selected connection under the simulated link failure condition;

g) repealing steps (e), end (f) for all connections of the network; and h) repeating steps (a) to (g) until either a link failure has been simulated on all links of the network or the summed availability has been determined to converge to a constant value, whichever is earlier.

* * * * *